E. I. DODDS.
BOLT.
APPLICATION FILED FEB. 16, 1915.
1,201,944.
Patented Oct. 17, 1916.
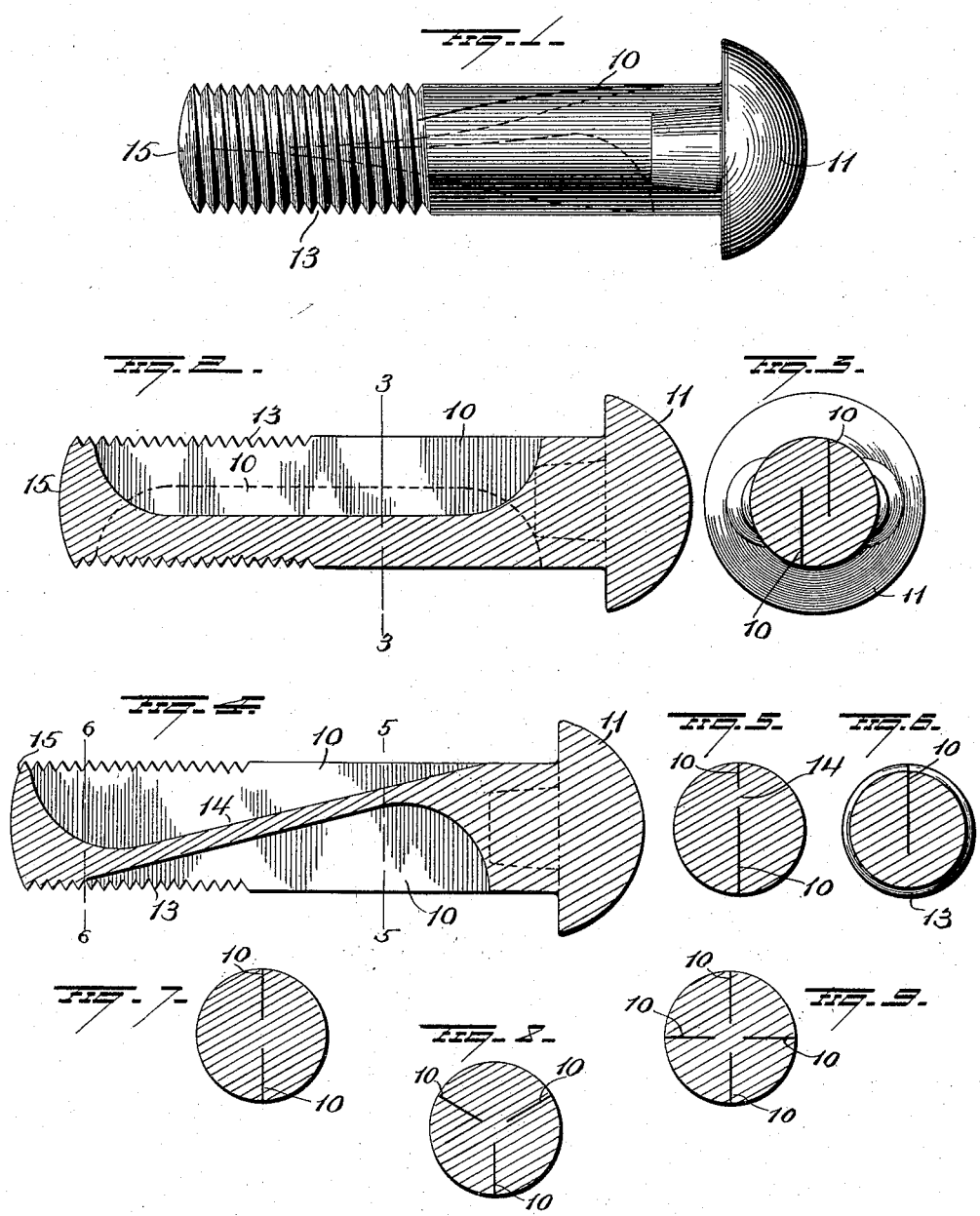
WITNESSES
INVENTOR
E. I. Dodds
Attorney

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

BOLT.

1,201,944.   Specification of Letters Patent.   Patented Oct. 17, 1916.

Application filed February 16, 1915. Serial No. 8,543.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Bolts; and I do hereby declare the following to be a full, clear, and exact description of the invention, such as will enable others skilled in the art to which it appertains to make and use the same.

My invention relates to an improvement in bolts designed more particularly for connecting railroad rails, the object being to provide a bolt capable of slight spring action longitudinally, thus permitting it to yield, and removing to a large extent, the conditions which tend to cause the nuts to work loose.

With this object in view my invention consists in the details of construction as will be more fully described and pointed out in the claims.

In the accompanying drawings, Figure 1 is a view in elevation of a bolt embodying my invention; Fig. 2 is a view in longitudinal section of Fig. 1 taken through one of the slots, the bolt being without the twist so as to show the approximate size and length of the slots; Fig. 3 is a view in transverse section on the line 3—3 of Fig. 2; Fig. 4 is a view similar to Fig. 2 of a modification; Fig. 5 is a view in cross section on the line 5—5 and Fig. 6 is a view on the line 6—6 of Fig. 4, and Figs. 7, 8 and 9 are views in cross section showing several ways of slotting the blank.

In the manufacture of the bolt, a round bar of steel is heated to the upsetting point and headed in dies in the usual manner, and while it is hot from the original heating or reheating, it is slotted as at 10 from a point adjacent the head 11 of the bolt, nearly but not through its opposite end, the slots 10 being off the center, as shown in Fig. 3, and extending more than half way through as shown in Figs. 2 and 3. The blank, while hot is then twisted a quarter turn more or less, but preferably not as great as a half turn, so that the slots will be in the forms of spirals each extending preferably about 90° around the bolt shank. The threads 13 at the end of the bolt may be hot or cold rolled, or they may be cut, but in either event they are formed after the bolt shank has been twisted.

During the process of manufacture, and before or after the threads have been formed, the bolts are tempered in oil, so as to increase their hardness without impairing their elasticity.

In the construction shown in Figs. 4, 5 and 6 the slots 10 are in the same plane, one being deepest adjacent the head and merging into the surface of the shank at the threaded end and near said end and the other deepest within the threaded end and merging into the surface of the shank adjacent the head, thus leaving a solid core 14 separating the two slots throughout the length of the latter.

Instead of two slots passing the center of the bolt as in Figs. 2 and 4 a plurality of slots as in Figs. 7, 8 and 9 may be employed all stopping short of the center, so as to leave a central integral core intermediate the bottom of the slots, these slots in all instances however, extending into the threaded end of the bolt and stopping short of the end so as to leave the extreme end 15 of the bolt intact, but weakened sufficiently so that it may break under the vibratory strains to which it is subjected.

After the slots have been formed, which is preferably done with tools which simply pierce without removing any of the metal, and before the threads are rolled or cut, the bolt shank is subjected to dies or other devices for closing the slots without welding the walls thereof.

By terminating the slots within the threaded end of the shank and adjacent the end of the latter I provide a semi-rigid section at the said end for the three-fold purpose of insuring sufficient rigidity while cutting the threads, and proper alinement or retention of the parts during the twisting operation. Again by slotting the bolt to a point near its free end, the cores or end walls of the slot are relatively weak and free to break when the bolt is subjected to vibratory stresses, and thus increase the flexibility of the bolt.

A steel bolt slotted and twisted as described is capable of slight elongation which permits it to give or yield under the pounding of the wheels on the rails at the joints, and which contracts to normal position as soon as the strains are removed. This prevents permanent elongation of the bolt, and maintains the nut at all times under a pressure sufficient to prevent it from turning, as it does on ordinary bolts after usage sufficient to cause a slight permanent elongation of the bolt.

Having fully described my invention what I claim as new and desire to secure by Letters-Patent, is:—

1. A bolt formed of an integral bar of metal having a head and a shank, the free end of which latter is threaded and the remaining portion plain, the said shank having a slot starting in the plain portion and terminating within the threaded part near the free end of the shank, leaving the said free end weakened but intact.

2. A bolt formed of an integral bar of metal having a head and a shank, the free end of which latter is threaded and the remaining portion plain, the said shank having oppositely disposed longitudinal slots starting in the plain portions and terminating within the threaded part near the free end of the shank, leaving the free end weakened but intact.

3. A bolt formed of an integral bar having a head and a threaded end, the shank of the bolt having oppositely disposed slots located at opposite sides of the center of the bolt and each passing more than half way through the bolt, each of said slots terminating within the threaded portion of the shank adjacent the free end of the said threaded portion.

In testimony whereof, I have signed this specification in the presence of two subscribing witnesses.

ETHAN I. DODDS.

Witnesses:
F. H. ALLISON,
EDWIN S. RYCE.

Copies of this patent may be obtained for five cents each, by addressing the "Commissioner of Patents, Washington, D. C."